US012584371B2

(12) United States Patent
Hillman et al.

(10) Patent No.: US 12,584,371 B2
(45) Date of Patent: Mar. 24, 2026

---

(54) SYNTACTIC FOAM PRESSURE HOUSING

(71) Applicant: ARAMCO SERVICES COMPANY, Houston, TX (US)

(72) Inventors: Thomas Hillman, Missouri City, TX (US); Christopher Powell, Houston, TX (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/637,180

(22) Filed: Apr. 16, 2024

(65) Prior Publication Data

US 2025/0320788 A1 Oct. 16, 2025

(51) Int. Cl.
| | |
|---|---|
| *C08J 9/22* | (2006.01) |
| *C08J 9/36* | (2006.01) |
| *E21B 23/04* | (2006.01) |
| *E21B 33/12* | (2006.01) |

(52) U.S. Cl.
CPC ............. *E21B 33/1208* (2013.01); *C08J 9/22* (2013.01); *C08J 9/36* (2013.01); *E21B 23/04* (2013.01); *C08J 2203/22* (2013.01)

(58) Field of Classification Search
None
See application file for complete search history.

(56) References Cited

U.S. PATENT DOCUMENTS

| | | | |
|---|---|---|---|
| 4,255,524 A | 3/1981 | Dawans et al. | |
| 4,595,623 A | 6/1986 | Du Pont et al. | |
| 6,068,915 A | * 5/2000 | Harrison ................ | C08J 9/0085 |
| | | | 428/313.5 |
| 6,778,470 B1 | 8/2004 | Monahan et al. | |

| | | | |
|---|---|---|---|
| 9,719,329 B2 | 8/2017 | Hradecky | |
| 2007/0027226 A1* | 2/2007 | Whinnery, Jr. ...... | C08G 18/092 |
| | | | 521/110 |
| 2013/0192828 A1 | 8/2013 | Kniffin et al. | |
| 2016/0320769 A1 | 11/2016 | Deffenbaugh et al. | |

FOREIGN PATENT DOCUMENTS

WO WO-2022005374 A1 * 1/2022 ................ C08J 9/36

OTHER PUBLICATIONS

Moller, James C. et al., "On the Nature of Epoxy Resin Post-Curing"; Polymers; vol. 12, Issue 2, Article 466; pp. 1-20; Feb. 2020 (20 pages).

Zeghlache, Mohamed Larbi et al., "Sensor-Ball:Field Deployment of Autonomous and Untethered Surveillance"; Proceedings of the International Petroleum Technology Conference; Paper No. IPTC-22255-MS; pp. 1-14; Feb. 21, 2022 (14 pages).

* cited by examiner

*Primary Examiner* — Melissa A Rioja
(74) *Attorney, Agent, or Firm* — Osha Bergman Watanabe & Burton LLP

(57) ABSTRACT

Systems and methods for forming and using a pressure housing to protect a downhole tool in a wellbore include machining an initial syntactic foam body into a pressure housing structure and post-curing the pressure housing structure in a programmable oven at a time-temperature program to produce a post-cured syntactic foam structure. Methods for protecting a downhole tool in a wellbore include containing the downhole tool in a post-cured syntactic foam structure, placing the structure in the wellbore and using the downhole tool contained in the post-cured syntactic foam structure in the wellbore, floating the post-cured syntactic foam structure containing the downhole to a surface location, and retrieving the post-cured syntactic foam structure containing the downhole tool. Systems for protecting a downhole tool in a wellbore include a post-cured syntactic foam structure positioned in the wellbore and a downhole tool pressure sealed within the post-cured syntactic foam structure.

14 Claims, 6 Drawing Sheets

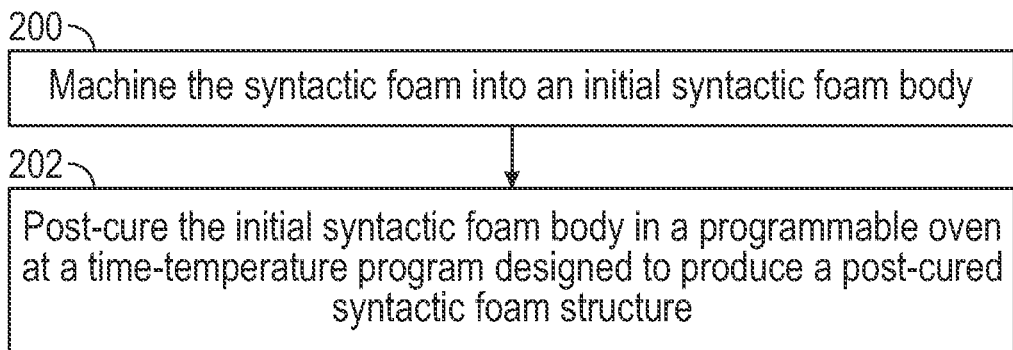

200

Machine the syntactic foam into an initial syntactic foam body

202

Post-cure the initial syntactic foam body in a programmable oven at a time-temperature program designed to produce a post-cured syntactic foam structure

FIG. 2A

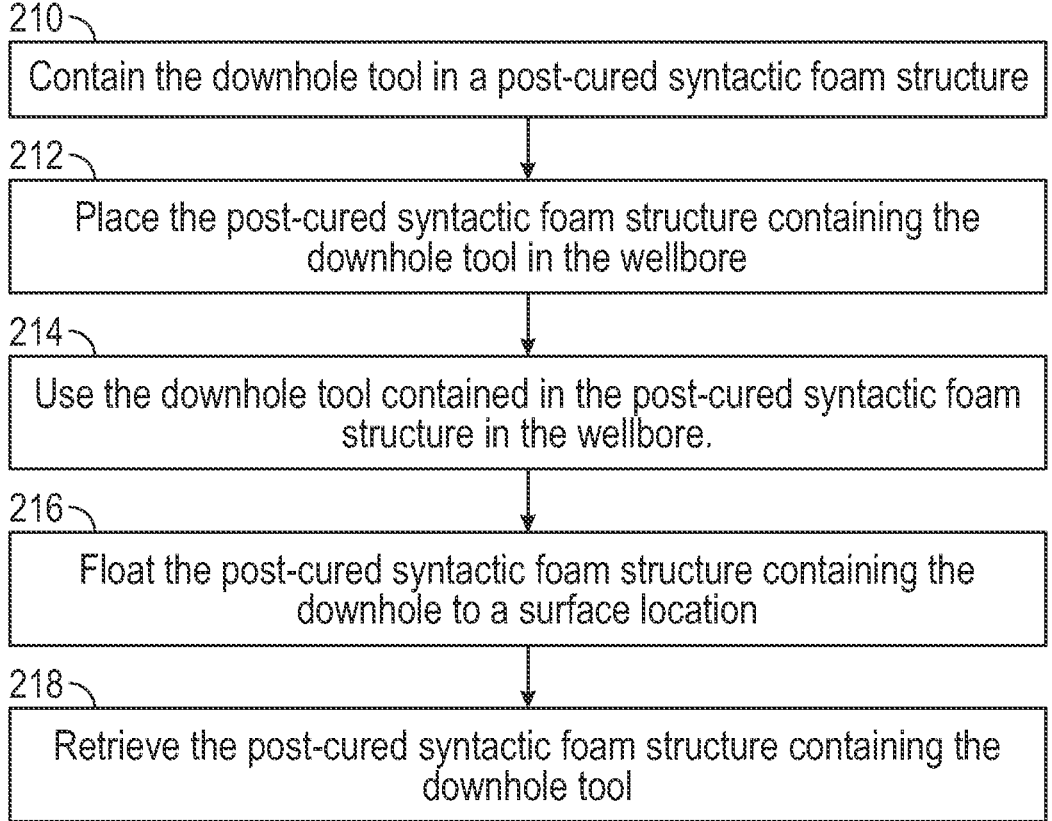

210

Contain the downhole tool in a post-cured syntactic foam structure

212

Place the post-cured syntactic foam structure containing the downhole tool in the wellbore

214

Use the downhole tool contained in the post-cured syntactic foam structure in the wellbore.

216

Float the post-cured syntactic foam structure containing the downhole to a surface location

218

Retrieve the post-cured syntactic foam structure containing the downhole tool

FIG. 2B

SYNTACTIC FOAM PRESSURE HOUSING

BACKGROUND

Typically, electrical components which are used downhole must be protected from conductive or corrosive fluids, as well as high pressures. The protection mechanism commonly used to protect downhole electrical components is a sealed metal housing called a "pressure housing," where the internal volume holds electronics at surface pressure. Some electronics are not harmed by downhole pressures and can be put into an oil-filled container which has some other means of equalizing internal and external pressure in order to protect the electronics from downhole fluids without being high pressure resistant.

A new class of small downhole tools are untethered and returned to the surface after use by becoming buoyant in the downhole fluids and floating back. The density of oil is as low as 0.7 g/cc, and therefore it is difficult to design a pressure housing which is strong enough to resist high downhole pressures (around 5000 psi) but light enough to float in oil when attached to buoyant elements. Such buoyant elements may include inflatables.

Syntactic foams are a lightweight, low density composite material made of a resin and microscopic hollow glass spheres. While syntactic foam may have a lower density than oil, the volume needed to float a downhole tool filled with electronics and batteries may be too large for some downhole applications. Additionally, current syntactic foams do not have sufficient structural strength to be used as the pressure housing designed for downhole environments as described above.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method for forming a pressure housing, including machining an initial syntactic foam body made of syntactic foam into a pressure housing structure and post-curing the pressure housing structure in a programmable oven at a time-temperature program to produce a post-cured syntactic foam structure.

In another aspect, embodiments disclosed herein relate to a method for protecting a downhole tool in a wellbore from wellbore conditions, including containing the downhole tool in a post-cured syntactic foam structure, placing the post-cured syntactic foam structure containing the downhole tool in the wellbore and using the downhole tool contained in the post-cured syntactic foam structure in the wellbore. The method also includes floating the post-cured syntactic foam structure containing the downhole to a surface location and retrieving the post-cured syntactic foam structure containing the downhole tool.

In yet another aspect, embodiments disclosed herein relate to a system for protecting a downhole tool in a wellbore, including a post-cured syntactic foam structure positioned in the wellbore and a downhole tool pressure sealed within the post-cured syntactic foam structure.

Other aspects and advantages of the claimed subject matter will be apparent from the following description and the appended claims.

BRIEF DESCRIPTION OF DRAWINGS

FIG. 2A is a post-curing method according to one or more embodiments.

FIG. 2B is a tool protection method according to one or more embodiments.

DETAILED DESCRIPTION

Figure 1A:
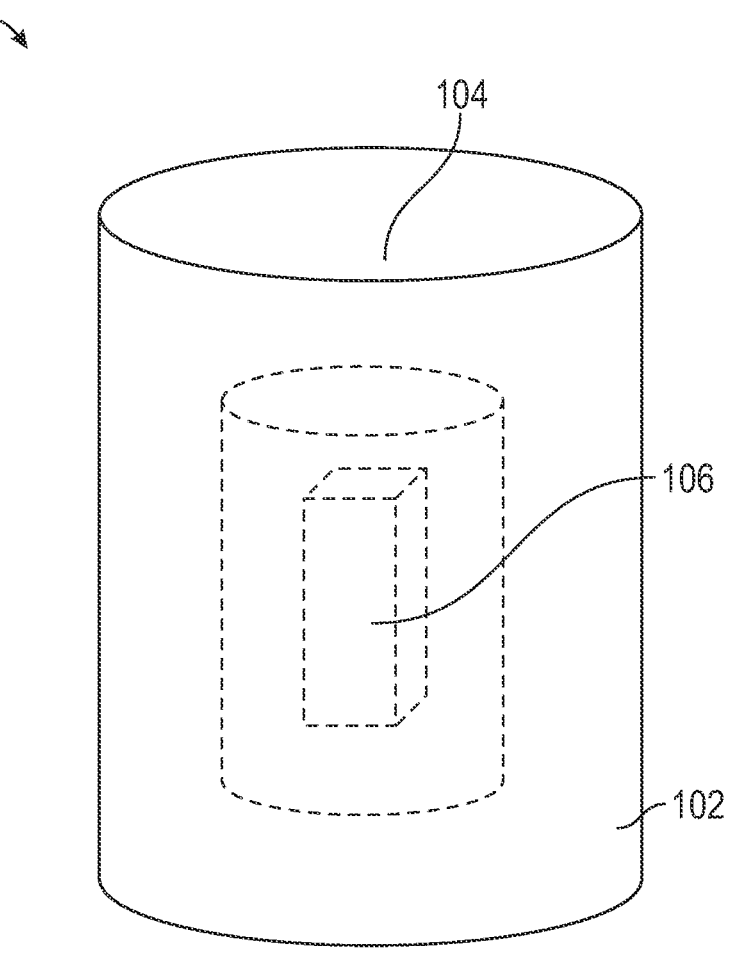
FIG. 1A is a pressure housing system according to one or more embodiments.

In general, embodiments disclosed herein relate to syntactic foam compositions, processes to produce a post-cured syntactic foam structure, and methods for protecting a downhole tool in a wellbore environment. For example, embodiments disclosed herein include using post-cured syntactic foam to form low density pressure housings for downhole applications. In one or more embodiments, post-cured syntactic foam pressure housings may be formed by cutting or otherwise providing a cavity within the pressure housing body, where the cavity forms an internal chamber in which electronics, sensors, or other downhole tools may be sealed. By sealing such components in the internal chamber of a post-cured syntactic foam pressure housing, the post-cured syntactic foam pressure housing may act as an external pressure vessel that is strong enough to be sent downhole into a wellbore environment, where the post-cured syntactic foam pressure housing may have increased buoyancy compared with conventional metal-based downhole pressure vessels.

A solid block of conventionally manufactured syntactic foam material may be able to withstand pressure to the rated compressive yield strength. However, when such foam material is cut or mounted in such a way that it encapsulates a volume of gas (e.g., in an internal chamber) at a different pressure than the external environment, then the compressive yield strength of the foam material is not determinative to its successful performance. Instead, radial, axial, and hoop stresses, for example, are generated in an application such as this, and other material properties come to play, such as the foam material's minimum tensile strength, the tensile modulus, and the flexural modulus.

By using syntactic foam compositions and the post-curing methods disclosed herein, the hardness of a syntactic foam composition may be sufficiently increased such that the syntactic foam composition may be used to form low density pressure housing capable of withstanding high pressure and high temperature environments, for example deep wellbores, without failing or breaking down.

Additionally, encapsulating a gas (e.g., air) at a low pressure inside a cavity in post-cured syntactic foam structures according to embodiments of the present disclosure may be done to lower the effective density of the entire assembly without the need for excessive amounts of foam.

The post-curing method of one or more embodiments gives the foam structure the strength required to contain the volume of air at atmospheric pressure regardless of the external pressure and without rupture.

Syntactic Foam Composition

Syntactic foam compositions disclosed herein generally include a polymer resin and a lightweighting additive. In one or more embodiments, the polymer resin in a syntactic foam composition may be, for example, a phenolic resin, a polyester polymer, or any other suitable resin type known in the art. In one or more embodiments, the lightweighting additive in a syntactic foam composition may be pre-formed hollow spheres, e.g., constructed from glass, ceramic, polymer, metal, or composite, and having a particle diameter ranging from about 10 microns to about 100 microns. In some embodiments, the amount of lightweighting additive is in a range of from about 50 vol % to about 80 vol % of the syntactic foam composition. The amount and/or particle size of the lightweighting additive in the syntactic foam composition may be selected to provide the syntactic foam with a target density.

In one or more embodiments, the syntactic foam composition may contain at least one additional additive, e.g., carbon fibers, glass fibers, pigments, fillers, and/or catalysts. A catalyst may be added to a syntactic foam composition in order to change the curing time and/or temperature of the material. In one or more embodiments, the amount of the additional additive in a syntactic foam composition is in a range of from greater than 0 vol % to about 60 vol %, such as ranging from a lower limit selected from any one of 0, 2, 4, and 5 vol %, to an upper limit selected from any one of 7.5, 10, 15, and 20 vol %, where any lower limit may be paired with any upper limit. In some embodiments, an additional additive is not present (0 vol % additional additive), and the syntactic foam composition may be formed entirely of a polymer resin and a lightweighting additive.

In one or more embodiments, components of a syntactic foam composition may be mixed together (e.g., in a commercial blender) and initially cured or set to form syntactic foam. In some embodiments, a mixed syntactic foam composition may be poured into a mold for initial curing to provide syntactic foam with an initial shape corresponding to the mold. Syntactic foam compositions may be initially cured under room temperature and/or under ultraviolet irradiation (UV-curing). In some embodiments, syntactic foam compositions may be initially cured under elevated temperatures. As used herein, a "syntactic foam composition" may refer to the uncured composition of syntactic foam, while the term "syntactic foam" may refer to the initially cured composition.

As initially formed, syntactic foam may have a density of from about 0.2 g/cc to about 0.8 g/cc. For example, syntactic foam may have a density in a range having a lower limit of any one of 0.2, 0.3, and 0.4 g/cc and having an upper limit of any one of 0.5, 0.6, 0.7 and 0.8 g/cc, where any lower limit may be paired with any mathematically compatible upper limit.

In one or more embodiments, the syntactic foam may also be annealed after initially being cured. According to embodiments disclosed herein, the annealing process may include raising the temperature of the syntactic foam to just below the glass transition temperature of the polymer resin and holding for a period of time in order to relieve internal stresses that may be developed during curing.

In one or more embodiments, a syntactic foam may be obtained commercially, which may then be processed according to embodiments disclosed herein to make the material suitable for downhole applications. For example, the syntactic foam composition may be a microsphere syntactic foam sold under the name "HZ-42" by Engineered Syntactic Systems.

Method for Post-Curing Syntactic Foam

One or more embodiments disclosed herein relate to a method for post-curing a syntactic foam to produce a post-cured syntactic foam structure. Post-cured syntactic foam structures according to embodiments of the present disclosure may be used to form downhole pressure housings. By using post-curing methods disclosed herein, a syntactic foam body may be formed into a shape that may be used for a downhole pressure housing, where the post-curing may provide the body with sufficient strength for use of the downhole pressure housing. In such manner, syntactic foam may be used to form a downhole pressure housing having a relatively high compressive yield strength compared with conventional syntactic foam and having greater buoyancy (or lower density) compared with conventional metal-based downhole pressure vessels.

In one or more embodiments, syntactic foam may be machined into a desired shape to form an initial syntactic foam body. One example of a desired shape useful for one or more embodiments disclosed herein includes, but is not limited to, the shape of one or more pressure housing structures. Post-cured syntactic foam pressure housing structures may be used for forming a pressure housing having an enclosed, pressure-scaled cavity, in which downhole tools (e.g., electronics) may be held. By using post-curing methods disclosed herein, a syntactic foam may be used to form a pressure housing structure having a selected pressure rating (i.e., the maximum pressure the pressure housing structure should be capable of withstanding at a given temperature).

In one or more embodiments, methods for post-curing a syntactic foam may include subjecting an initial syntactic foam body to a heat treatment schedule designed to produce a post-cured syntactic foam structure having selected properties capable of withstanding downhole conditions and/or having a selected pressure rating, e.g., to produce a pressure housing structure. Such methods may include placing an initial syntactic foam body in a programmable oven and post-curing the initial syntactic foam body using a time-temperature program designed to produce a post-cured syntactic foam structure. The oven may be any commercially available oven capable of receiving a time-temperature program. The time-temperature program may be preselected to provide specific and selected properties to the post-cured syntactic foam structure, as discussed herein. Thus, as described herein, a post-cured syntactic foam may be formed through two curing processes—initially curing a syntactic foam composition to form a syntactic foam and post-curing the syntactic foam to convert the syntactic foam to the post-cured syntactic foam.

A time-temperature program for post-curing according to embodiments of the present disclosure may include heating an initial syntactic foam body to a maximum temperature of about 25° C. to about 35° C. below a rated temperature of the post-cured syntactic foam structure. As used herein, the "rated temperature" is defined as a maximum temperature that the post-cured syntactic foam structure is designed to withstand at a given pressure. In some embodiments, the post-cured syntactic foam structure has a rated temperature of about 125° C. when subjected to 5000 psi of pressure.

Time-temperature programs according to one or more embodiments may generally include soaking the entire initial syntactic foam body (e.g., in an oven) at elevated temperatures (e.g., from greater than room temperature or 25° C. up to a maximum temperature of about 25° C. to about 35° C. below a rated temperature of the post-cured syntactic foam structure, such as a maximum temperature of 95° C. for a 125° C. temperature rated body) for a duration (e.g., about 150 to 200 minutes) that allows the internal volume of the material to thermalize, thereby preventing stresses in the material due to uneven thermal expansion. In one or more embodiments, such time-temperature programs may be designed to improve material thermalization. Examples of time-temperature programs according to embodiments of the present disclosure are provided below, but embodiments of the present disclosure are not necessarily limited to such examples.

According to one or more embodiments, a time-temperature program may be a stepped heating schedule including a schedule of temperature increases, where each temperature increase is followed by a temperature hold. The final temperature hold in a time-temperature program according to embodiments of the present disclosure may be at least 150 minutes (e.g., 150-200 minutes).

For example, a time-temperature program may include the following steps. First, an initial syntactic foam body may be heated in an oven at a first temperature increase to a first temperature, e.g., about 30° C. In one or more embodiments, the first temperature increase may be conducted in a first ramp duration, which may be less than about 5 minutes. Then, the structure may be held in a first temperature hold at the first temperature (e.g., about 30° C.) for a first hold duration, e.g., about 90 min. Then, the structure may be heated in a second temperature increase for a second ramp duration (e.g., about 30 min) to a second temperature (e.g., about 50° C.). Then, the structure may be held in a second temperature hold at the second temperature (e.g., about 50° C.) for a second hold duration (e.g., about 150 min). Then, the structure may be heated in a third temperature increase for a third ramp duration (e.g., about 60 min) to a third temperature (e.g., about 95° C.). Then, the structure may be held in a third temperature hold at the third temperature (e.g., about 95° C.) for a third hold duration (e.g., about 150 min). Finally, the structure may be cooled for a cooling duration (e.g., about 180 min) to a cooled temperature (e.g., room temperature (about 20-25° C.). While the aforementioned example time-temperature program outlines specific temperatures and time ranges (durations) for the temperature increases, holds, and cooling parameters, one skilled in the art may appreciate that the specific temperatures and durations may be modified according to the initial syntactic foam composition used and the desired properties of the post-cured syntactic foam structure.

In some embodiments, a time-temperature program may be a stepped heating schedule, where the steps may have evenly, or approximately evenly, stepped temperature increases based on a selected rated temperature of the resulting post-cured syntactic foam. For example, in one or more embodiments, a time-temperature program may be designed to heat a structure in a selected number of heat/hold steps to a maximum temperature, where the maximum temperature is calculated as a rated temperature for the post-cured syntactic foam minus a buffer temperature amount (e.g., 25° C. to 35° C.). The stepped heating temperatures may then be calculated to be equal to or approximately equal to the maximum temperature divided by the selected number of heat/hold steps (e.g., 3 to 8). In such embodiments, the below general process may be used to design the temperature increases in a time-temperature program:

A) calculate the maximum temperature of the time-temperature program using the following equation: rated temperature-buffer temperature=maximum temperature;

B) select the number of heat/hold steps; and

C) calculate the temperature increase amount using the following equation: (maximum temperature)/selected number of heat/hold steps=temperature increase increment.

In one or more embodiments, the ramp durations of each temperature increase may be equal or different from each other. For example, in some embodiments, a first temperature increase ramp duration may be different from the subsequent temperature increase ramp durations, while the subsequent temperature ramp durations may be equal to each other. In another example, each subsequent temperature increase ramp duration may be longer than the previous temperature increase ramp duration.

Each temperature increase is followed by a temperature hold. The temperature hold durations following each temperature increase in the time-temperature program may be equal or different from each other. In one or more embodiments, temperature hold durations may be progressively longer. For example, a second temperature hold duration may be 1.5 times a first temperature hold duration, and a third temperature hold duration may be 2 times the first temperature hold duration. In some embodiments, temperature hold durations may be longer than the temperature increase ramp durations of each temperature increase. For example, each temperature hold duration in a time-temperature program may be 2-5 times the temperature increase ramp duration of each preceding temperature increase in the time-temperature program.

In one or more embodiments, the syntactic foam structure is heated at the maximum temperature for a duration of at least 150 minutes to allow the material time to thermalize. Heating the syntactic foam structure at the maximum temperature for at least 150 minutes may relieve stresses in the material due to uneven thermal expansion. For example, the syntactic foam structure may be heated at the maximum temperature for 150 min, 180 min, 210 min, or 240 min.

Alternatively, a time-temperature program useful for one or more embodiments disclosed herein may include a single temperature increase and a single temperature hold. For example, in such embodiments, a time-temperature program may include heating an initial syntactic foam body in an oven to a first temperature (e.g., about 95° C.) and holding the structure in a single temperature hold at the first temperature for a hold duration (e.g., about 390 min).

Upon post-curing an initial syntactic foam body in an oven at a time-temperature program according to embodiments disclosed herein, a post-cured syntactic foam structure is obtained.

One or more embodiments relate to a method for post-curing a syntactic foam to produce a post-cured syntactic foam structure, as illustrated in FIG. 2A. In step 200 of FIG. 2A, syntactic foam is machined into an initial syntactic foam body in the shape of a pressure housing structure. In step 202, the initial syntactic foam body is post-cured in a programmable oven according to a time-temperature program designed to produce a post-cured syntactic foam structure having the shape of the pressure housing structure.

In one or more embodiments, the post-cured syntactic foam structure may be coated. Coating a post-cured syntactic foam structure may prevent moisture from penetrating into the outer surface of the material, where water penetration may increase the density of the structure. Coating a post-cured syntactic foam structure may also prevent oxidation and UV damage. In one or more embodiments, the coating may be hydrophobic. In one or more embodiments, the coating may be hydrophilic. In one or more embodiments the post-cured syntactic foam structure may be uncoated.

Post-Cured Syntactic Foam-Properties

Post-cured syntactic foam of one or more embodiments may have a density of from about 0.2 g/cc to about 0.8 g/cc. Post-cured syntactic foam of one or more embodiments may have a density in a range having a lower limit of any one of 0.2, 0.3, and 0.4 g/cc and having an upper limit of any one of 0.5, 0.6, 0.7 and 0.8 g/cc, where any lower limit may be paired with any mathematically compatible upper limit. Although post-curing syntactic foam bodies according to embodiments of the present disclosure may not significantly lower the density of the syntactic foam, the post-curing treatments may increase the strength of the syntactic foam enough to allow the syntactic foam to be formed into a pressure housing capable of withstanding downhole conditions, where the overall density of post-cured syntactic foam bodies according to embodiments of the present disclosure may be lowered by the internal cavities formed in the pressure housing.

Post-cured syntactic foam of one or more embodiments may have a compressive strength of from about 2,000 psi to about 100,000 psi. Post-cured syntactic foam of one or more embodiments may have a compressive strength in a range having a lower limit of any one of 2,000 psi, 5,000 psi, and 10,000 psi and having an upper limit of any one of 50,000 psi, 75,000 psi, and 100,000 psi, where any lower limit may be paired with any mathematically compatible upper limit.

Post-cured syntactic foam of one or more embodiments may have a buckling strength of from about 3000 psi to about 5500 psi, where the buckling strength refers to the structure's ability to resist buckling under external pressure. Post-cured syntactic foam of one or more embodiments may have a buckling strength in a range having a lower limit of any one of 3000, 3250, 3500 and 4000 psi and having an upper limit of any one of 4250, 4500, and 5500 psi where any lower limit may be paired with any mathematically compatible upper limit.

The buckling strength may be measured by subjecting the post-cured syntactic foam to a maximum pressure value in a pressure chamber. The pressure may then be ramped from 0 psi to the maximum pressure value, such as 5500 psi, ten times. If the post-cured syntactic foam does not break down, or buckle, at the maximum pressure value, then the post-cured syntactic foam is recorded to have at least a buckling strength of the maximum pressure value tested.

The post-cured syntactic foam of one or more embodiments may have a rated temperature of at least 125° C. at a pressure of 5000 psi. For example, the post-cured syntactic foam of one or more embodiments may have a temperature resistance of 125° C., 150° C., or 200° C. at a pressure of 5000 psi.

The rated temperature may be measured by subjecting the post-cured syntactic foam to a maximum temperature value in a pressure chamber. The temperature may then be set to the maximum temperature value, such as 130° C., and maintained for about 1 hour at a pressure of 6000 psi. If the post-cured syntactic foam does not physically break down, crack at pressure, fracture into multiple pieces, or melt, at the maximum temperature value, then the post-cured syntactic foam is recorded to have at least a rated temperature of the maximum temperature value tested. A pass or fail of the rated temperature test is qualitatively measured by visual examination of cracks, splits, or deformation as well as by checking for leakage on the pressure test chart. As a safety factor, the post-cured syntactic foam may be rated at a rated temperature of 125° C. and 5000 psi after passing the test described above.

Method and System for Protecting Downhole Tool

According to embodiments of the present disclosure, a post-cured syntactic foam structure may be used to protect a downhole tool in a wellbore. For example, in one or more embodiments, a method for protecting a downhole tool in a wellbore includes containing the downhole tool in a post-cured syntactic foam structure and placing the post-cured syntactic foam structure containing the downhole tool in the wellbore. In some embodiments, the method also includes using the downhole tool contained in the post-cured syntactic foam structure in the wellbore, then floating the post-cured syntactic foam structure containing the downhole to a surface location and retrieving the post-cured syntactic foam structure containing the downhole tool.

FIG. 1A shows a cavity view of a post-cured syntactic foam pressure housing according to one or more embodiments. The post-cured syntactic foam pressure housing system 100 includes the post-cured syntactic foam structure 102. The post-cured syntactic foam structure 102 may include a cavity 104 in which a downhole tool 106 may be placed.

The size of the cavity 104 according to one or more embodiments may depend on several factors. For example, the size of the cavity 104 may depend on the size of the post-cured syntactic foam pressure housing system 100 and the size and weight of the downhole tool 106. The size of the cavity 104 may also depend on the density of fluids located in the wellbore where the pressure housing 100 may be deployed. In one or more embodiments, the post-cured syntactic foam structure 102 may include more than one cavity 104. In one or more embodiments, the size of the cavity or cavities 104 may be designed such that the effective pressure housing system density is less than the density of fluids located in the wellbore where the pressure housing 100 may be deployed. "Effective pressure housing system density" as used herein refers to a density of a pressure housing system which includes a summation of the density of the post-cured syntactic foam structure, the density of the cavit(ies) formed therein, and the weight of any devices held within the pressure housing structure. In one or more embodiments, the effective pressure housing system density is less than the density of fluids located in the wellbore where the pressure housing system 100 may be deployed such that the pressure housing system 100 may float to the surface of the earth after use. In one or more embodiments, the cavity 104 also provides a protective, low pressure environment to protect the downhole tool 106.

With the downhole tool 106 positioned in the cavity of the post-cured syntactic foam structure 102, the cavity may then be sealed to pressure seal the downhole tool 106 within the post-cured syntactic foam structure 102. The dashed lines of FIG. 1 indicate a cavity portion 104 of the post-cured syntactic foam structure 102 to illustrate encapsulation of the downhole tool 106.

In one or more embodiments, the downhole tool may be electronic devices such as sensors, capacitors, microcontrollers, piezoelectric devices, and resistive elements.

Figure 1B:
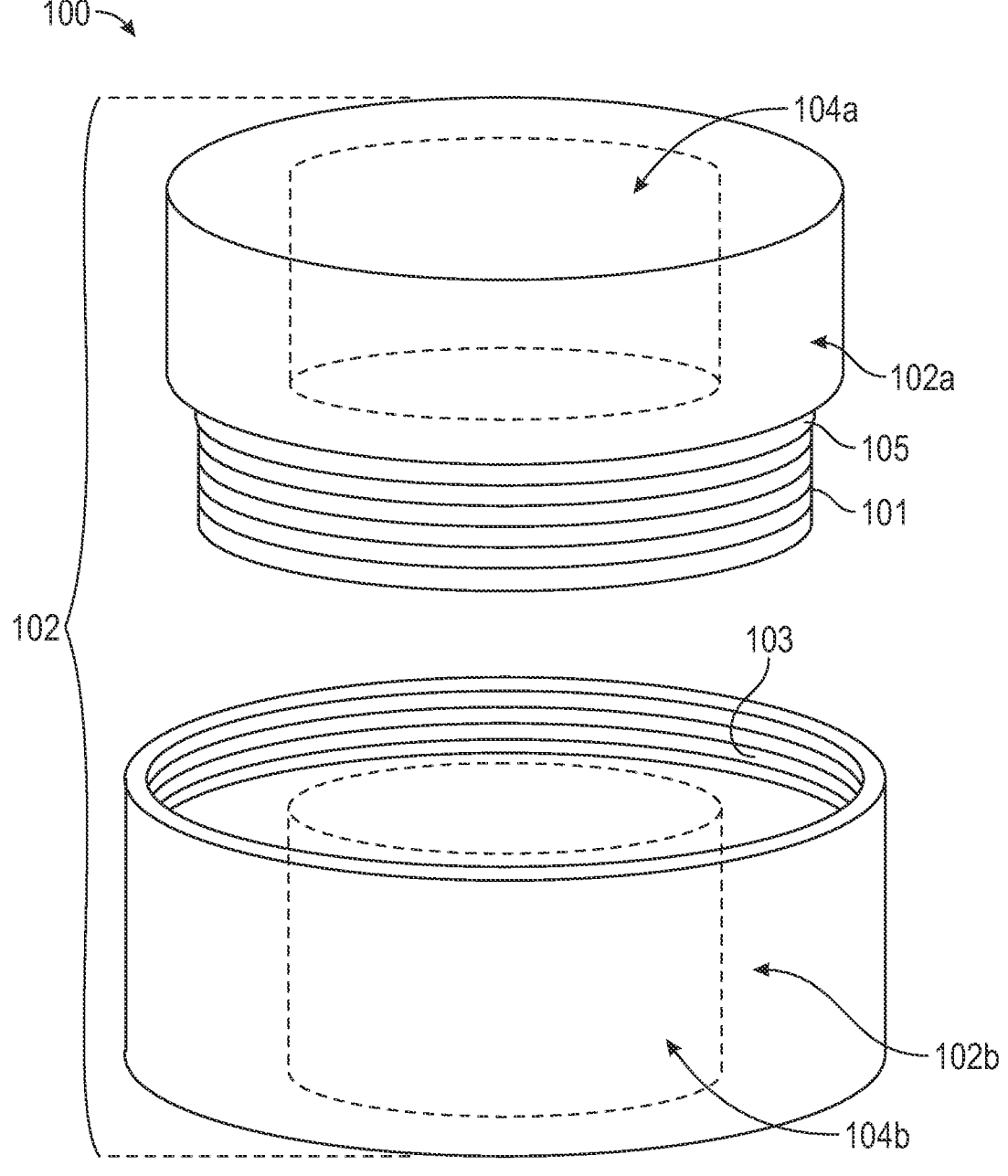
FIG. 1B illustrates another view of a post-cured syntactic foam pressure housing according to one or more embodiments.

FIG. 1B illustrates an example of how the post-cured syntactic foam pressure housing system 100 may be assembled to pressure seal the downhole tool within the post-cured syntactic foam structure 102. In one or more embodiments, the post-cured syntactic foam structure 102 may include a first half 102*a* and a second half 102*b*. In some embodiments, the cavity portion may extend partially into the first half 102*a* and the second half 102*b* of the post-cured syntactic foam structure 102. For example, the first half 102*a* may have a first cavity portion 104*a* and the second half 102*b* may have a second cavity portion 104*b*. In one or more embodiments, the cavity portion 104*a*, 104*b* may be symmetrical between the first half 102*a* and the second half 102*b*. In one or more embodiments, the cavity portion 104*a*, 104*b* may be asymmetrical between the first half 102*a* and the second half 102*b*. In some embodiments, the cavity portion may be located only on the first half 102*a* or the second half 102*b*.

The first half 102*a* and the second half 102*b* may be joined together by threads. For example, the first half 102*a* may have a first set of threads 101 formed on an axial end of the first half 102*a*. The axial end having the first set of threads 101 may have a diameter which is smaller than the overall diameter of the first half 102*a* of the pressure housing. The second half 102*b* may have a second set of threads 103 provided on an internal surface on an axial end of the second half 102*b*. The first set of threads 101 on the first half 102*a* are configured to threadedly connect to the second set of threads 103 on the second half 102*b*. In one or more embodiments, an o-ring 105 may be fitted on the first set of threads 101 to create a seal when the first half 102*a* is threadedly connected to the second half 102*b*. In one or more embodiments, the o-ring 105 may prevent fluids from entering the post-cured syntactic foam structure 102.

According to one or more embodiments, the o-ring may be made of a material selected from the group consisting of nitrile, hydrogenated nitrile, silicone rubber, polyacrylate, ethylene propylene rubber, neoprene, fluorocarbon, and Teflon, or the like.

Figure 1C:
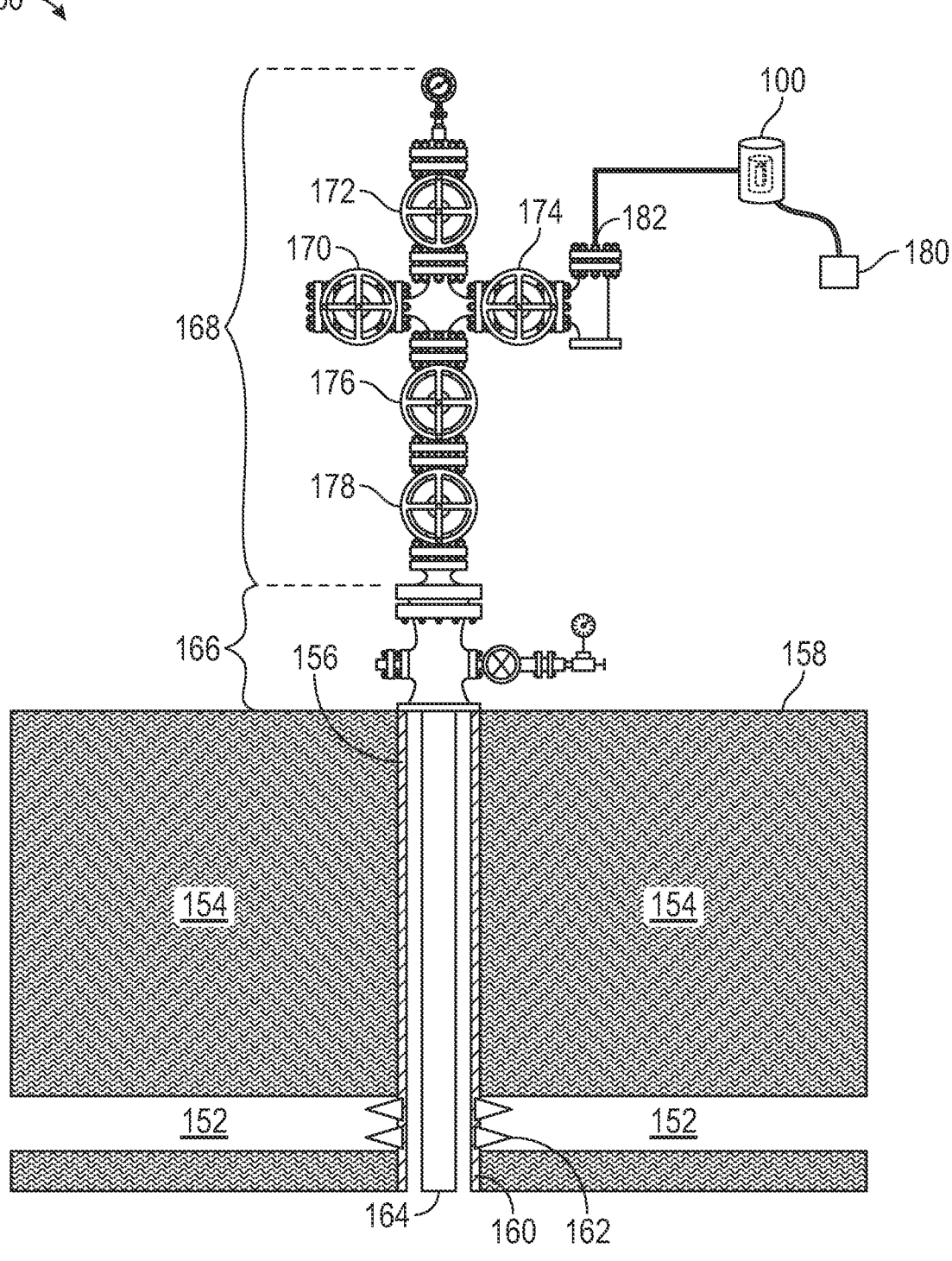
FIG. 1C is a system according to one or more embodiments.

FIG. 1C shows an example of a system for protecting a downhole tool in a wellbore, where the system includes an example well site, a post-cured syntactic foam structure, and a downhole tool. As illustrated by the system 150 of FIG. 1C, fluids are produced from a reservoir 152 in a formation 154 by drilling a wellbore 156 into the formation 154, establishing a flow path between the reservoir 152 and the wellbore 156, and conveying the fluids from the reservoir 152 to a surface 158 through the wellbore 156. A casing 160 may be installed in wellbore 156. In some embodiments, the casing 160 may be perforated to have perforations 162 into the reservoir 152 to allow a flow of the fluids to enter the wellbore 156. Typically, a production tubing 164 is disposed in the wellbore 156 to carry the fluids to the surface 158. The production tubing 164 hangs from a wellhead 166 at the surface 158. The production tubing 164 extends past the reservoir 152, thereby forming a flow conduit from the reservoir 152 to surface 158.

A tree (also known as a Christmas tree) 168 is disposed on top of the wellhead 166 to control the flow of fluids into or out of the wellbore 156, depending on whether it is an injection well or a production well. Christmas tree 168 includes a configuration of valves to control the fluids being injected into or pumped out of the wellbore 156. For example, the Christmas tree 168 may have an injection wing valve 170, a swab valve 172, a production wing valve 174, an upper master valve 176, and a lower master valve 178. When an operator is ready to conduct well operations the valves 170-178 are either opened or closed to control the fluids being injected into or pumped out of the wellbore 156. During injection, the production wing valve 174 and the swab valve 172 are closed while the injection wing valve 170, the upper master valve 176, and the lower master valve

178 are open to allow for fluids to be injected through the Christmas tree 168 and into the wellbore 156. During production, the injection wing valve 170 and the swab valve 172 are closed while the production wing valve 174, the upper master valve 176, and the lower master valve 178 are open to control or isolate fluid flow.

The post-cured syntactic foam pressure housing 100 containing a downhole tool 106 may then be run-in-hole. The post-cured syntactic foam pressure housing 100 may include a drop-weight 180, attached to the syntactic pressure housing 100, used to carry the post-cured syntactic foam pressure housing 100 into the wellbore 156. The drop-weight 180 may be released after the post-cured syntactic foam pressure housing 100 reaches a target depth in the wellbore 156 such that the post-cured syntactic foam pressure housing 100 into the wellbore 156 is retrievable after properties are measured using the downhole tool 106. In some embodiments, the drop-weight 180 attached to the pressure housing 100 may be released such that the pressure housing 100 may be un-tethered and floated to the surface of the earth 158 after use.

While the example system shown in FIG. 1C shows an example well site located on-shore, systems and methods according to one or more embodiments may be used in any other oil and gas production well, for example in an offshore well.

One or more embodiments relate to a method to protect a downhole tool in a wellbore from wellbore conditions, as outlined in FIG. 2B. In step 210, a downhole tool is contained in a post-cured syntactic foam structure. In one or more embodiments, the downhole tool may be pressure sealed within the post-cured syntactic foam structure. In step 212, the post-cured syntactic foam structure containing the downhole tool is placed in the wellbore. In some embodiments, the wellbore may be opened using valves at the surface, the pressure housing is dropped in the well, and sealed in by closing the surface valves. In step 214, the downhole tool contained in the post-cured syntactic foam structure is used in the wellbore. In step 216, the post-cured syntactic foam structure containing the downhole is floated to a surface location, and in step 218 the post-cured syntactic foam structure containing the downhole tool is retrieved.

Examples

The following examples are included for illustrative purposes only and are in no way intended to be considered limiting.

Example 1 is an initial syntactic foam body having the shape of a pressure housing, which was not post-cured. In Example 1, a syntactic foam block made of HZ-42 microsphere syntactic foam (made of hollow glass microspheres in a resin matrix) was acquired from Engineered Syntactic Systems. The syntactic foam block was machined to form a pressure housing structure. The syntactic foam pressure housing structure was tested at elevated temperature and pressure to test the integrity of the structure using the procedure described above, to determine a rated temperature and a rated pressure of the syntactic foam pressure housing.

Figure 3:
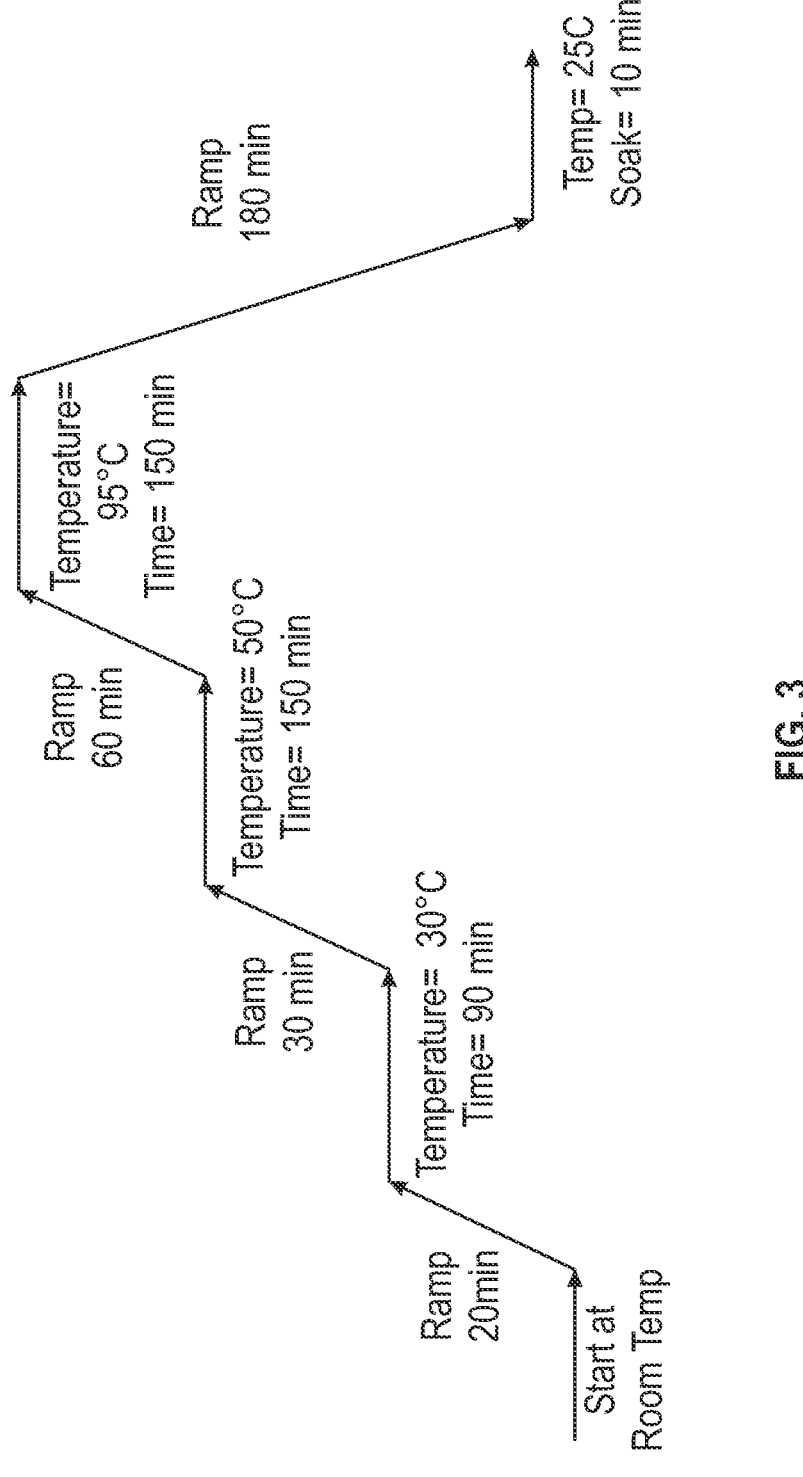
FIG. 3 is a post-curing schedule according to one or more embodiments.

Example 2 is a post-cured syntactic foam pressure housing, which was post-cured. Example 2 was prepared as described in Example 1, except that the structures in Example 2 were post-cured according to a method for post-curing as described in embodiments herein. Particularly, the structures in Example 2 were post-cured using a series of heating and soaking (holding) steps. In this example, the syntactic foam pressure housing was temperature rated to 125° C. and a maximum temperature of 95° C. was used in the post-curing method. The post-curing method applied to Example 2 is outlined in FIG. 3. FIG. 3 shows a representation of the program used to execute the post-curing method on an oven for post-curing the syntactic foam pressure housings.

According to some embodiments of the present disclosure, rather than a stepped time-temperature program, a single elevated temperature may be applied to post-cure a syntactic foam structure to achieve similar material strengthening.

The structures in Example 2 were tested for a rated temperature and a rated pressure as described with respect to Example 1, above.

Figure 4A:
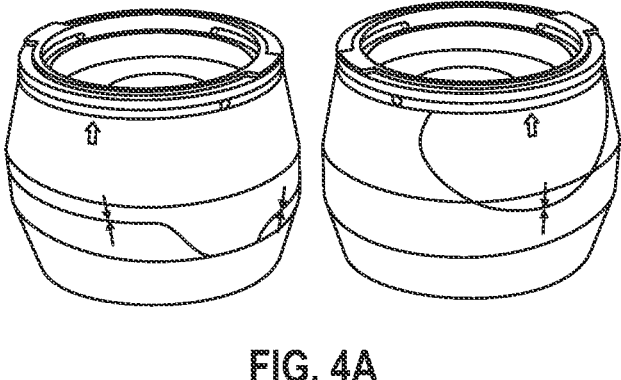
FIGS. 4A-4B illustrate examples according to one or more embodiments.
Figure 4B:
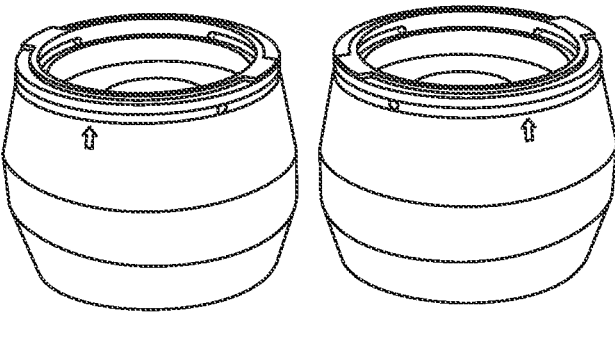

FIGS. 4A and 4B show pressure housings that were made according to Example 1 and Example 2, respectively. In FIG. 4A, syntactic foam pressure housings from Example 1, which were not post-cured, cracked during testing to determine the rated temperature and the rated pressure. The structures of Example 1 therefore, failed testing according to one or more embodiments. In FIG. 4B, post-cured syntactic foam pressure housings from Example 2, which were post-cured according to embodiments of the present disclosure, remained intact after testing to determine the rated temperature and the rated pressure, with no cracks or other imperfections according to visual inspection. Thus, the structures of Example 2 passed testing according to one or more embodiments and are rated with a rated temperature of 125° C. and a rated pressure of 5000 psi.

Conventional pressure housings for downhole electronics are typically made of sealed metal housings having a strength capable of withstanding downhole pressures and conditions. However, such conventional designs are generally weighty, which presents a challenge when trying to provide enough buoyancy to float the housing in downhole fluids such as crude oil (having a density of about 0.7 g/cc). By using methods disclosed herein, machining to form a cavity portion and post-curing step can be applied to syntactic foams to significantly increase their structural strength so that they can be used as pressure housings for downhole applications.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A method, comprising:
   machining an initial syntactic foam body made of syntactic foam into an initial pressure housing structure; and
   post-curing the initial pressure housing structure in a programmable oven at a time-temperature program to produce a post-cured syntactic foam structure in a form of a pressure housing, wherein the time-temperature program comprises the following steps:
      heating the initial pressure housing structure in the programmable oven to a first temperature of about 30° C.;
      holding at the first temperature for about 90 min;
      heating for about 30 min to a second temperature of about 50° C.;
      holding at the second temperature for about 150 min;
      heating for about 60 min to a third temperature of about 95° C.;

holding at the third temperature for about 150 min;
      cooling for about 180 min to a fourth temperature of about 25° C.; and
      holding at the fourth temperature for about 10 min.

2. The method of claim 1, wherein the syntactic foam comprises:
   a polymerized resin; and
   a lightweighting additive.

3. The method of claim 2, wherein the syntactic foam further comprises at least one additional additive.

4. The method of claim 3, wherein the at least one additional additive comprises a catalyst.

5. The method of claim 1, wherein the time-temperature program includes heating the initial pressure housing structure to a maximum temperature of about 25° C. to about 35° C. below a rated temperature of the post-cured syntactic foam structure at a pressure of 5000 psi.

6. The method of claim 1, wherein the time-temperature program is a stepped heating schedule comprising a selected number of heat/hold steps, wherein each heat/hold step comprises:
   a temperature increase, heating to a temperature over a ramp duration; and
   a hold duration following the temperature increase, where the temperature is held for the hold duration.

7. The method of claim 6, wherein the ramp duration for at least two of the heat/hold steps is equal.

8. The method of claim 6, wherein the hold duration for at least two of the heat/hold steps is different.

9. The method of claim 1, wherein the time-temperature program comprises a step of heating the initial syntactic foam body at a maximum temperature for at least 150 min.

10. The method of claim 1, wherein the post-cured syntactic foam structure has a density of about 0.2 g/cc to about 0.8 g/cc.

11. The method of claim 1, wherein the post-cured syntactic foam structure has a rated temperature of at least 125° C. at a pressure of 5000 psi.

12. A method, comprising:
   machining an initial syntactic foam body made of syntactic foam into an initial pressure housing structure; and
   post-curing the initial pressure housing structure in a programmable oven at a time-temperature program to produce a post-cured syntactic foam structure in a form of a pressure housing,
   wherein the time-temperature program comprises heating the initial pressure housing structure in the programmable oven to a temperature of about 95° C. and then holding the initial pressure housing structure at about 95° C. for about 390 min.

13. The method of claim 12, further comprising:
   enclosing a downhole tool in the pressure housing;
   placing the pressure housing containing the downhole tool in a well;
   using the downhole tool contained in the pressure housing in the well;
   floating the pressure housing containing the downhole tool to a surface location; and
   retrieving the pressure housing containing the downhole tool.

14. The method of claim 1, further comprising:
   enclosing a downhole tool in the pressure housing;
   placing the pressure housing containing the downhole tool in a well;
   using the downhole tool contained in the pressure housing in the well;

floating the pressure housing containing the downhole
   tool to a surface location; and
retrieving the pressure housing containing the downhole
   tool.

* * * * *